May 10, 1949.  K. E. E. HALLIN  2,469,502
COMBINATION LENGTH BAR
Filed June 21, 1946  2 Sheets-Sheet 1
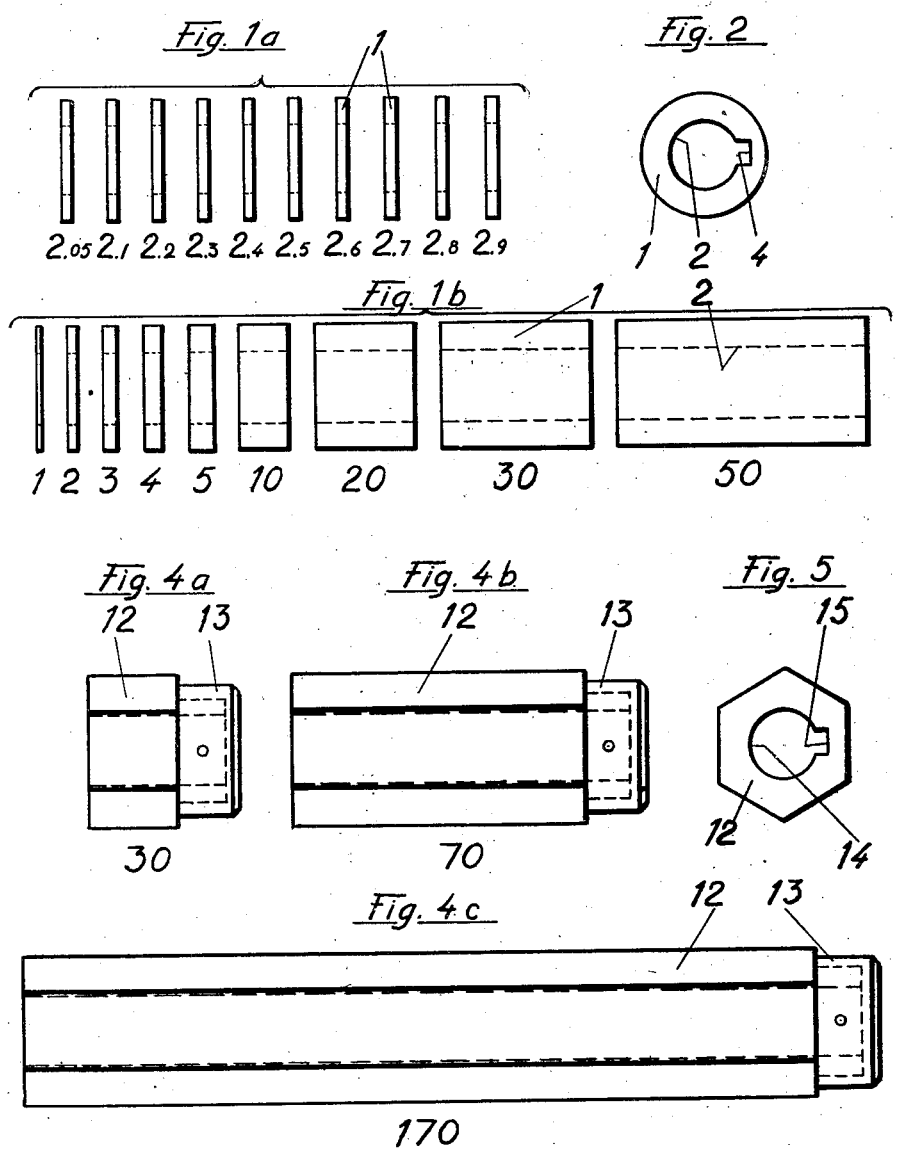
Inventor:
Karl Erik Evert Hallin
by W. Bayard Jones
Attorney

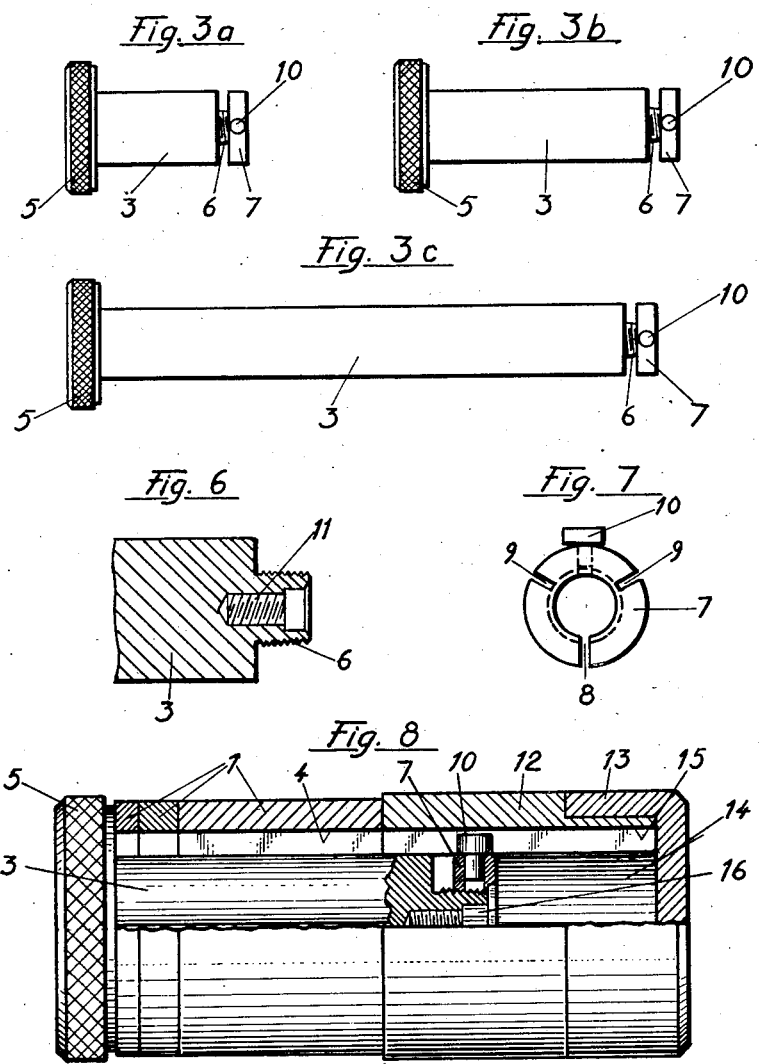

Patented May 10, 1949

2,469,502

UNITED STATES PATENT OFFICE 2,469,502

COMBINATION LENGTH BAR

Karl Erik Evert Hallin, Eskilstuna, Sweden, assignor to Aktiebolaget C. E. Johansson, Eskilstuna, Sweden, a company of Sweden Application June 21, 1946, Serial No. 678,489
In Sweden June 25, 1945

4 Claims. (Cl. 33—168)

The present invention relates to a length gauge or combination length bar which is assembled from several parts or members and which is intended to be used as a factory gauge in the place of the assignee's well-known combination gauge block sets in such cases when accurate measures are not required such as those that may be obtained by the use of the said gauge block sets. Like the said gauge block sets, the present length bar or gauge comprises a plurality of gauge blocks having plane and parallel measuring surfaces, but, with a view to lowering the cost of production these surfaces are not made so accurate that they adhere to one another due to the force of adhesion alone. For this reason the gauge blocks must be combined with a device for holding the blocks together so that the desired measures may be obtained. A length bar or gauge of the type here contemplated, therefore, comprises a bolt or stud, one or more gauge blocks having plane and parallel measuring surfaces and which are provided with through holes perpendicular to the said measuring surfaces so that they may be pushed onto the bolt or stud, and an end sleeve having a definite length in which the bolt or stud, with the gauge block or blocks thereon, may be inserted and to which it may be locked. In order to obtain a certain measure it is merely necessary to push onto the bolt a suitable number of gauge blocks so chosen that together with the length of the end sleeve and the length of the head, if any, of the bolt, they give the desired measure, and then insert the bolt in the end sleeve.

According to the present improvement, the bolt is provided at its free end, which is adapted to be inserted in the end sleeve, with a conical screw onto which a slotted nut having a corresponding conical screw thread is screwed, so that when the bolt has been inserted in the end sleeve and is afterwards turned relatively to the same, the nut is expanded and pressed against the inner side of the sleeve, thus locking the bolt in the end sleeve. In this way it is possible to effect an easy and rapid locking of the bolt in the end sleeve without disturbing the value of the measure. When the bolt is turned and the nut is expanded and pressed against the inner side of the sleeve, the nut tends to pull the bolt inwards into the sleeve which ensures that the gauge blocks will contact closely with one another and with the end sleeve and the head of the bolt. The slotted nut may be provided with a projection on its outer side which is otherwise cylindrical, said projection being adapted to engage a longitudinal groove in the inner side of the end sleeve in order to prevent the nut from being carried along when the bolt is turned, the gauge blocks being preferably provided with corresponding notches or grooves so that the projection on the nut will not prevent the blocks from being pushed onto the bolt.

The accompanying drawings illustrate by way of example a constructional form of a length gauge or bar according to the invention. Figs. 1a and 1b show a plurality of gauge blocks of different lengths to be used for assembling the gauge, and Fig. 2 shows an end view of one of these gauge blocks. Figs. 3a, 3b and 3c show three bolts of different lengths onto which bolts the gauge blocks are to be pushed. Figs. 4a, 4b and 4c show three end sleeves of different lengths, and Fig. 5 shows an end view of one of these sleeves. Fig. 6 shows to a larger scale and in axial section one end of a bolt with its conical screw, and Fig. 7 shows the associate nut viewed from one end. Finally, Fig. 8 shows, also to a larger scale, an assembled length gauge or bar according to the invention.

Figs. 1a and 1b show a plurality of gauge blocks, nineteen in all, having different lengths of measures. These gauge blocks 1 consist of round washers or cylinders which are provided with plane and parallel end surfaces which constitute the measuring surfaces, and with through holes 2 perpendicular to said measuring surfaces and of such size that the gauge blocks may be pushed onto any one of the bolts illustrated in Figs. 3a, 3b and 3c. For a purpose to be explained here below, each gauge block is provided with a notch or groove 4 at one side of the through hole 2. The nineteen gauge blocks are arranged in two series, the first series shown in Fig. 1a comprising ten blocks representing the values 2.05, 2.1, 2.2, 2.3 . . . 2.8 and 2.9 mm., while the second series shown in Fig. 1b comprises nine blocks representing the values 1, 2, 3, 4, 5, 10, 20, 30, and 50 mm. These measures represent the distance between the plane end surfaces of the gauge blocks.

Each of the bolts 3 illustrated in Figs. 3a, 3b and 3c is provided at one end with a knurled head 5 for turning the bolt, and at the other end with a short conical screw 6 which is preferably made integral with the bolt, as shown in Fig. 6. Screw-threaded onto said screw is a nut 7 having a corresponding conical screw thread and which is split at 8 at one point of its circumference and is provided at two other points with comparatively deep slots 9. In this way the nut is capable of expanding comparatively easily, when it is screwed further onto the conical screw 6. Each nut 7 has the same outer diameter as the diameter of the holes 2 in the gauge blocks 1, and is provided on its outside with a projection which, in the instance illustrated, consists of a pin 10 the head of which has such shape that it can pass freely through the notches or grooves 4 in the gauge blocks 1 when the latter are pushed onto the bolts 3. The screw 6 is provided with a screw-threaded bore 11 into which a lock screw 16 may be inserted, as shown in Fig. 8, for preventing the nut 7 from being screwed loose from the screw 6 and from being lost.

When assembling the gauge, one of the bolts 3 illustrated in Figs. 3a, 3b and 3c is inserted in one of the three end sleeves 12 illustrated in Figs. 4a, 4b and 4c. The sleeves have different lengths, but are otherwise constructed in the same manner, and have a hexagonal cross-sectional shape, in the instance illustrated. Each sleeve is closed at one end by means of an end cap 13, and is open at its opposite end, and is provided with a longitudinal bore 14 which has the same diameter as the outside diameter of the bolts 3 and the diameters of the holes 2 in the gauge blocks 1. Each sleeve is also provided with an internal longitudinal groove 15 having the same profile as the grooves 4 in the gauge blocks 1, so that it is possible to insert the bolts 3 with their nuts 7 and the projections 10 thereon in the sleeves. In the instance illustrated it is assumed that the sleeve shown in Fig. 4a has a length, including the end cap, of 30 mm., the sleeve shown in Fig. 4b has a length of 70 mm., and the sleeve shown in Fig. 4c has a length of 170 mm. The head 5 of the bolts 3 is assumed to have a length of 6 mm.

Fig. 8 illustrates a length gauge or bar assembled of the members above described. In order to obtain a length gauge having a certain desired measure, an end sleeve 12 of a suitable length and a bolt 3 of a suitable length are selected, after which a number of guage blocks 1 are slid onto the bolt, said blocks being so chosen that together with the length of the selected end sleeve 12 and the length of the head 5 they give the desired measure. For instance, the length gauge illustrated in Fig. 8 is compiled of the shortest end sleeve 12, shown in Fig. 4a, the shortest bolt 3, shown in Fig. 3a, and three gauge blocks 1 having the values 2.2, 4 and 20 mm. These three gauge blocks are slid onto the bolt up to the head 5 thereof. The projecting end of the bolt carrying the nut 7 is then inserted in the sleeve 12 as far as it will go and in such manner that the projection 10 on the nut 7 passes into the groove 15 in the sleeve. By means of the head 5 the bolt 3 is then turned in such direction relatively to the sleeve 12 that the nut 7, which is prevented from turning by the projection 10 engaging the groove 15, is screwed further up on the conical screw 6 of the bolt 3. In this way the nut 7 is caused to epxand and is pressed against the inside of the sleeve, so that the bolt with the gauge blocks placed thereon becomes locked to the end sleeve. The desired length gauge, which has the dimension 6+2.2+4+20+30=62.2 mm., is now ready and may be used for measuring operations in the usual manner. It should be observed that when the nut 7 expands due to the bolt 3 being turned as above stated, and is pressed against the inside of the sleeve 12, the nut tends to pull the bolt into the sleeve. In this way it is ensured that the gauge blocks 1 will contact closely with one another and with the head 5 and the end sleeve 12.

The constructional form above described and illustrated in the drawings is only to be regarded as an example, and its details may, of course, be modified in several ways without departing from the principle of the invention.

I claim:

1. A combination length bar comprising a bolt, a number of gauge blocks having plane and parallel measuring surfaces and provided with through holes perpendicular to said measuring surfaces enabling said gauge blocks to be pushed onto said bolt, an end sleeve having a bore adapted to receive said bolt, a conical screw at one end of said bolt, and a split nut screwed onto said conical screw, said nut having an external diameter adapted to fit the bore in said sleeve, whereby said bolt with said nut thereon may be inserted in said sleeve, and means for locking said nut and said sleeve against rotational movement relatively to one another, whereby turning movement of said bolt relatively to said sleeve expands said nut and presses the same against said sleeve to lock said sleeve to said bolt.

2. A combination length bar comprising a bolt, a number of gauge blocks having plane and parallel measuring surfaces and provided with through holes perpendicular to said measuring surfaces enabling said gauge blocks to be pushed onto said bolt, an end sleeve having a bore adapted to receive said bolt, a conical screw at one end of said bolt, a split nut screwed onto said conical screw, said nut having an external diameter adapted to pass into the bore in said sleeve, a projection on the external diameter of said nut, and a groove in the bore of said sleeve adapted to receive said projection on said nut, whereby said bolt with said nut thereon may be inserted in said sleeve and be locked thereto by turning movement of said bolt relatively to said sleeve expanding said nut and pressing the same against said sleeve.

3. A combination length bar comprising a bolt, an end sleeve having a bore adapted to receive said bolt, a conical screw at one end of said bolt, a split nut screwed onto said conical screw, said nut having an external diameter adapted to pass into the bore in said sleeve, a projection on the external diameter of said nut, a number of gauge blocks having plane and parallel measuring surfaces and provided with through holes perpendicular to said measuring surfaces and adapted to fit said bolt and with notches in said holes providing clearance for said projection on said nut whereby said gauge blocks may be pushed over said nut onto said bolt, and a groove in the bore of said sleeve adapted to receive said projection on said nut, whereby said bolt with said nut thereon may be inserted in said sleeve and be locked thereto by turning movement of said bolt relatively to said sleeve expanding said nut and pressing the same against said sleeve.

4. A combination length bar comprising a bolt, a plurality of gauge blocks having plane and parallel measuring surfaces and provided with through holes perpendicular to said measuring surfaces enabling said gauge blocks to be disposed on said bolt, an end sleeve having an opening of non-circular cross section adapted to receive said bolt, a conical screw at one end of said bolt, and an expandible nut screwed onto said conical screw for engaging in locking relationship at least a portion of the wall of said opening in said end sleeve when expanded by rotation of said bolt, said expandible nut having a shape such that it cooperates with the wall of said opening to prevent rotational movement of said nut with respect to said sleeve to permit expansion of said nut, whereby turning movement of said bolt relatively to said sleeve will cause said nut to tend to draw said bolt into said sleeve as it is expanded into locking engagement with said sleeve in order to lock said sleeve to said bolt with said gauge blocks in closely contacting relationship to each other.

KARL ERIK EVERT HALLIN.

REFERENCES CITED

The following references are of record in the file of this patent:

UNITED STATES PATENTS

| Number | Name | Date |
| --- | --- | --- |
| 764,662 | Gibbs | July 12, 1904 |
| 1,491,100 | Hoke | Apr. 22, 1924 |
| 1,646,368 | Carr | Oct. 18, 1927 |
| 2,296,820 | Lester | Sept. 22, 1942 |
| 2,371,302 | Lester | Mar. 13, 1945 |